UNITED STATES PATENT OFFICE.

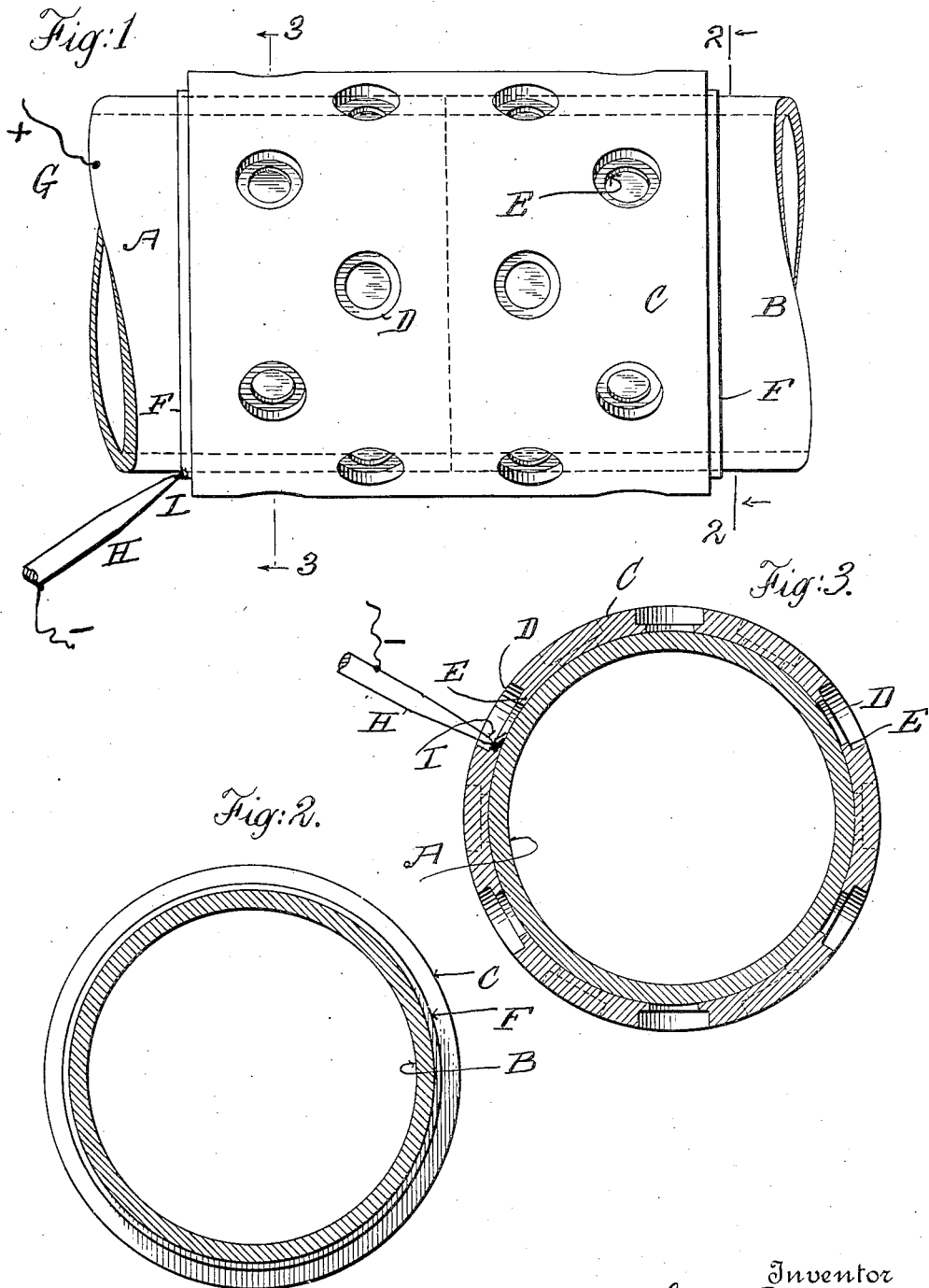

THOMAS E. MURRAY, OF NEW YORK, N. Y.

METHOD OF ELECTRICALLY UNITING METAL BODIES.

1,293,872. Specification of Letters Patent. Patented Feb. 11, 1919.

Application filed April 27, 1918. Serial No. 231,057.

*To all whom it may concern:*

Be it known that I, THOMAS E. MURRAY, a citizen of the United States, residing at New York, in the county of New York and State of New York, have invented a certain new and useful Improvement in Methods of Electrically Uniting Metal Bodies, of which the following is a specification.

The invention is a method of electrically uniting metal bodies having faces in contact, whereby the metal at the exposed edge of one of said bodies being electrically fused is caused to close the joint between said faces.

I herein illustrate my invention applied to a pipe coupling, which comprises a sleeve receiving the ends of the pipes to be united, the said sleeve having openings in its wall, the edges of said openings and of the ends of the sleeve being united to said pipes in accordance with my method.

In the accompanying drawings—

Figure 1 is an elevation of a pipe coupling, illustrating my method. Fig. 2 is a section on the line 2, 2 of Fig. 1. Fig. 3 is a section on the line 3, 3 of Fig. 1.

Similar letters of reference indicate like parts.

A and B are two pipes having their end portions entering the sleeve C, and preferably abutting. In the sleeve C are a number of openings D, disposed preferably circumferentially around the sleeve. When the sleeve is in place, the surfaces of said pipes are exposed at said openings. Each opening has an internal flange or rib E which bears upon the periphery of the inclosed pipe. At each end of the sleeve C is a rib F of less thickness than said sleeve. One terminal G of a circuit is connected to one of the pipes—here pipe A. The other terminal is connected to a movable electrode H, the end I of which is tapered so that it may be approximated to the ribs F at the ends of the sleeve and to the ribs E in openings D. When the electrode is placed in contact with the rib F and progressively moved over said rib, it fuses said rib, and the fused metal closes the joint between the end of the sleeve C and the pipe A or B, as the case may be. Equally, if the electrode H be inserted in any opening D in contact with the rib E and progressively moved around and in contact with said rib, said rib will then be fused, and the fused metal will unite the sleeve C to the inclosed pipe.

I claim:

1. The method of uniting two metal plates having faces in contact, which consist in first reducing the thickness of one of said plates along an exposed edge thereof, and then moving an electrode progressively along said reduced edge to fuse the metal thereof, whereby said fused metal is caused to close the joint between said faces.

2. In combination with pipes to be coupled, a pipe coupling, comprising a metal sleeve receiving the ends of said pipes and having in its wall a plurality of openings, the said sleeve being united to the said pipes by the metal of said sleeve electrically fused at the inner edges of said openings.

In testimony whereof I have affixed my signature in presence of two witnesses.

THOMAS E. MURRAY.

Witnesses:
GERTRUDE T. PORTER,
MAY T. MCGARRY.